US012577132B2

(12) United States Patent
Miyazawa et al.

(10) Patent No.: US 12,577,132 B2
(45) Date of Patent: Mar. 17, 2026

(54) ULTRAPURE WATER PRODUCTION SYSTEM AND ULTRAPURE WATER PRODUCTION METHOD

(71) Applicant: NOMURA MICRO SCIENCE CO., LTD., Atsugi (JP)

(72) Inventors: Hiroki Miyazawa, Atsugi (JP); Yukio Noguchi, Atsugi (JP)

(73) Assignee: NOMURA MICRO SCIENCE CO., LTD., Atsugi (JP)

( * ) Notice: Subject to any disclaimer, the term of this patent is extended or adjusted under 35 U.S.C. 154(b) by 321 days.

(21) Appl. No.: 18/298,452

(22) Filed: Apr. 11, 2023

(65) Prior Publication Data

US 2023/0242419 A1     Aug. 3, 2023

Related U.S. Application Data

(63) Continuation of application No. PCT/JP2021/017241, filed on Apr. 30, 2021.

(30) Foreign Application Priority Data

Oct. 22, 2020     (JP) ................................. 2020-177465

(51) Int. Cl.
 C02F 1/20 (2023.01)
 B01D 61/04 (2006.01)
 (Continued)

(52) U.S. Cl.
 CPC .............. C02F 1/441 (2013.01); B01D 61/04 (2013.01); B01D 61/16 (2013.01); C02F 1/20 (2013.01); C02F 9/00 (2013.01)

(58) Field of Classification Search
 CPC .... C02F 1/441; C02F 9/00; C02F 1/20; C02F 1/283; C02F 1/42; C02F 1/444;
 (Continued)

(56) References Cited

U.S. PATENT DOCUMENTS

2011/0210072 A1     9/2011     Kobayashi
2011/0278222 A1     11/2011     Ikuno et al.
 (Continued)

FOREIGN PATENT DOCUMENTS

JP     62-266194 A     11/1987
JP     63-141694 A     6/1988
 (Continued)

OTHER PUBLICATIONS

English translation of JP_H0630792, Apr. 27, 1994. (Year: 1994).*
 (Continued)

*Primary Examiner* — Joseph W Drodge

(74) *Attorney, Agent, or Firm* — Oblon, McClelland, Maier & Neustadt, L.L.P.

(57) ABSTRACT

An ultrapure water production system to produce an ultrapure water, includes a pre-treatment unit 2; a primary pure water production unit 3; a secondary pure water production unit 4; a storage unit 5 provided to precede the pre-treatment unit 2 or between the pre-treatment unit 2 and the primary pure water production unit 3, the storage unit 5 being capable of storing raw water or treatable water; a recovery treatment unit 6 to remove impurities mixed in a used ultrapure water obtained after use of the ultrapure water and containing hydrogen peroxide with passing a part or the whole of the hydrogen peroxide therethrough, to make a recovered water; and a circulator 7 to circulate the recovered water obtained from the recovery treatment unit 6 to feed the recovered water back to the storage unit 5.

17 Claims, 1 Drawing Sheet

(51) Int. Cl.

| | | |
|---|---|---|
| *B01D 61/16* | (2006.01) | |
| *C02F 1/44* | (2023.01) | |
| *C02F 9/00* | (2023.01) | |

(58) Field of Classification Search

CPC ........... C02F 2103/04; C02F 2103/346; C02F 2209/40; C02F 2303/04; C02F 2303/18; C02F 2305/023; C02F 1/44; C02F 1/281; B01D 61/02; B01D 61/58; B01D 61/026; B01D 61/025; B01D 2311/06; B01D 2311/25; B01D 2311/251; B01D 2311/26; B01D 2311/2626; B01D 61/04; B01D 61/16

See application file for complete search history.

(56) References Cited

U.S. PATENT DOCUMENTS

| | | | | |
|---|---|---|---|---|
| 2016/0199435 A1* | 7/2016 | Szeto | ..................... | A61K 38/07 |
| | | | | 514/4.8 |
| 2022/0162104 A1 | 5/2022 | Takahashi et al. | | |

FOREIGN PATENT DOCUMENTS

| | | | | |
|---|---|---|---|---|
| JP | 5-261284 | A | | 10/1993 |
| JP | 8-39079 | A | | 2/1996 |
| JP | 2004181364 | A | * | 7/2004 |
| JP | 2006-297180 | A | | 11/2006 |
| JP | 2010-158605 | A | | 7/2010 |
| JP | 2011-224424 | A | | 11/2011 |
| JP | 2012-96187 | A | | 5/2012 |
| JP | 2012-188318 | A | | 10/2012 |
| JP | 5454468 | B2 | | 1/2014 |
| JP | 2014-213306 | A | | 11/2014 |
| JP | 2014-226642 | A | | 12/2014 |
| JP | 2015-100733 | A | | 6/2015 |
| JP | 2015-157262 | A | | 9/2015 |
| JP | 2020-146619 | A | | 9/2020 |
| JP | 2021-194587 | A | | 12/2021 |
| TW | 200938491 | A | * | 9/2009 .............. B01J 41/05 |
| TW | 1461370 | B | * | 11/2014 .............. B01J 41/05 |
| WO | WO-2016199435 | A1 | * | 12/2016 ................ C02F 1/32 |
| WO | WO-2019188964 | A1 | * | 10/2019 ................ C02F 1/70 |

OTHER PUBLICATIONS

English translation of JP_2004181364A, Jul. 2, 2004. (Year: 2004).*

English translation of TW_1461370B, Nov. 21, 2014. (Year: 2014).*

English translation of TW_200938491_A, Sep. 16, 2009. (Year: 2009).*

English translation of WO_2016199435_A1, Dec. 15, 2016. (Year: 2016).*

English translation of WO_2019188964_A1, Oct. 3, 2019. (Year: 2019).*

Matuura, "Oxygen Oxidization Reaction", Maruzen Publishing Co., Ltd., Feb. 25, 1977, pp. 61, 62, and 237 (Total 5 pages) (submitting English Translation only).

Ikuo, "Science of Ultra Pure Water", Realize Inc, Sep. 11, 1990, pp. 164-165 and 191-202 (Total 25 pages) (submitting English Translation only).

Matuura, "Oxygen Oxidation Reaction", Maruzen Co., Ltd., Feb. 25, 1977, pp. 61 and 237 (Total 4 pages).

Shindo, "The Science of Ultrapure Water", Realize Co., Ltd., Sep. 11, 1990, pp. 164-165 and 191-202 (Total 16 pages).

International Search Report issued Jul. 6, 2021 in PCT/JP2021/017241 filed Apr. 30, 2021 2 pages.

Combined Chinese Office Action and Search Report issued Apr. 30, 2025 in Chinese Patent Application No. 202180068852.2 (with English translation of Office Action only), 16 pages.

* cited by examiner

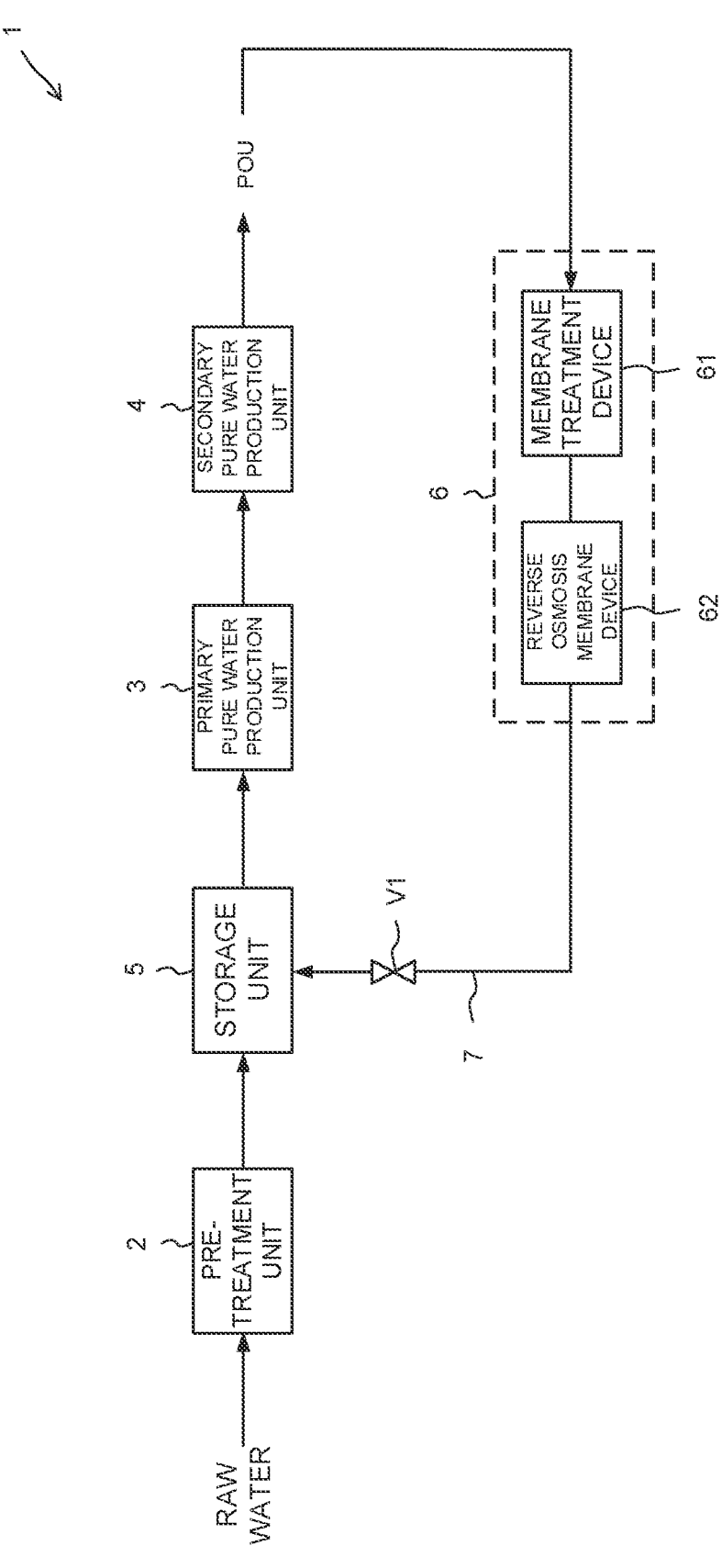

ULTRAPURE WATER PRODUCTION SYSTEM AND ULTRAPURE WATER PRODUCTION METHOD

CROSS-REFERENCE TO RELATED APPLICATIONS

This application is a continuation of prior International Application No. PCT/JP2021/17241 filed on Apr. 30, 2021 which is based upon and claims the benefit of priority from Japanese Patent Application No. 2020-177465, filed on Oct. 22, 2020; the entire contents of all of which are incorporated herein by reference.

FIELD

Embodiments relate to an ultrapure water production system and an ultrapure water production method that reuse used ultrapure water as treatable water for ultrapure water production.

BACKGROUND

Ultrapure water is generally produced by purifying raw water through a pre-treatment unit and a primary pure water production unit to make pure water, and then subjecting the made pure water to cleaning treatment with a secondary pure water production unit. The produced ultrapure water is supplied to a point of use (POU).

In general, the pre-treatment unit comprises at least one of treatment devices for coagulation sedimentation, sand filtration, activated carbon adsorption, pH adjustment, and the like. The primary pure water production unit comprises devices such as a filtration separation treatment device, an absorption treatment device, a reverse osmosis membrane (RO) device, an ultraviolet oxidation device, a deaeration device, an ion exchange treatment device, and the like. The secondary pure water production unit comprises devices such as the ultraviolet oxidation device, the ion exchange treatment device, an ultrafiltration device, and the like.

The used ultrapure water, which is used at the point of use, can be recovered and reused for ultrapure water production when the used ultrapure water contains a lot of impurities such as chemicals. This used ultrapure water is purified by removing the impurities from the used ultrapure water, the purified water is recovered, and the recovered water is fed back to the primary pure water production unit.

An example of the ultrapure water is used with being mixed with chemical solutions such as SC-2, SPM, and FPM for cleaning a semiconductor wafer with a semiconductor manufacturing system. Thus, the used ultrapure water contains acid and hydrogen peroxide. Examples of the acid include a sulfuric acid, a phosphoric acid and a hydrofluoric acid. Accordingly, the ultrapure water used for the cleaning is recovered through a removal system that removes impurities contained in the chemical solutions and contained by using the ultrapure water for the cleaning.

Known examples of such removal system for recovering the ultrapure water, include an ultrapure water production system having activated carbons for removal of hydrogen peroxide and an ion exchange device for removal of acid components or the like, the activated carbons consisting of the combination of a first activated carbon and a second activated carbon, the first activated carbon having higher ability to decompose the hydrogen peroxide than that of the second activated carbon, the second activated carbon having lower ability to decompose the hydrogen peroxide than that of the first activated carbon, the ultrapure water production system completely removing the hydrogen peroxide.

This removal system has a recovery treatment unit having the activated carbons and the ion exchange device, the activated carbons being provided to precede the ion exchange device to be used for treating substance before the treatment with the ion exchange device. This structure, which has the activated carbons to remove the hydrogen peroxide and precede the ion exchange device, is required for maintaining a life of the device and enabling effective ion exchange treatment because: the ion exchange device has low resistance to hydrogen peroxide; and the ion exchange device cause trouble by decomposing the hydrogen peroxide during supplying water through the ion exchange device to generate oxygen.

Such recovery treatment using the activated carbons can remove most of the impurities containing the hydrogen peroxide in the recovered water circulated through the primary pure water production unit. This enables reusing the recovered water as treatable water for the ultrapure water production to preferably continuously produce the ultrapure water without consideration of an effect due to mixing of the impurities in the use.

SUMMARY

Incidentally, the reuse of such recovered water is generally performed by once storing the recovered water in the storage unit for mixing with pre-treated water obtained by the pre-treatment unit to make mixed water, and using the mixed water mixed in the storage unit as the treatable water. Such a storage unit may be contaminated by proliferation of microorganisms and containing of organic substances derived therefrom and the like, because the mixed water is retained in the storage unit for a while. This contamination can be generally prevented by adding sodium hypochlorite to the storage unit or an optional point preceding to the storage unit. However, the presence of the recovered water increases an addition amount of the sodium hypochlorite.

Additionally, the sodium hypochlorite causes malfunctions of the reverse osmosis membrane device and the ion exchange resin device following the recovery treatment unit regardless of the presence/absence of the recovered water. Hence, the sodium hypochlorite should be removed before reaching these devices. Insufficient removal of the sodium hypochlorite causes troubles in the devices following the recovery treatment unit. One cause of these troubles includes variation of a proper amount of the sodium hypochlorite in response to an increase/decrease in an amount of the recovered water.

Further, a path from the purified portion of the recovery treatment unit to another device such as the reverse osmosis membrane device can be in environment which cause the proliferation of the microorganisms. Accordingly, for example, the proliferation of microorganisms often causes the trouble in the reverse osmosis membrane device, a prefilter thereof, and the like.

The present inventors have made intensive studies for solving the above problems, resulting in finding and accomplishing the present invention. That is, it is an object of the invention of the application to provide a production system and a production method of ultrapure water which can contribute to cleaning of the units, with a simple structure, by recovering the ultrapure water after use in a state of containing the hydrogen peroxide in recovery thereof.

An ultrapure water production system for producing ultrapure water includes a pre-treatment unit, a primary pure water production unit, and a secondary pure water production unit. The ultrapure water production system includes: a storage unit provided to precede the pre-treatment unit or between the pre-treatment unit and the primary pure water production unit, the storage unit capable of storing a raw water or a treatable water (a treatment target water or a water to be treated); a recovery treatment unit to remove impurities mixed in a used ultrapure water obtained after use of the ultrapure water and containing hydrogen peroxide with passing a part or the whole of the hydrogen peroxide therethrough, to make a recovered water; and a circulator to circulate the recovered water obtained from the recovery treatment unit to feed the recovered water back to the storage unit.

An ultrapure water production method treats raw water in a pre-treatment unit, a primary pure water production unit, and a secondary pure water production unit to produce ultrapure water. The raw water or a treatable water is storable in a storage unit provided to precede the pre-treatment unit or provided between the pre-treatment unit and the primary pure water production unit. The ultrapure water production method includes: removing impurities mixed in a used ultrapure water obtained after use of the ultrapure water and containing hydrogen peroxide with passing a part or the whole of the hydrogen peroxide therethrough, to make a recovered water; and circulating the recovered water to feed the recovered water back to the storage unit.

One of the embodiments enables recovering the used ultrapure water used for the semiconductor production or the like with the hydrogen peroxide remaining in the used ultrapure water, and circulating the used ultrapure water to reuse it for the production of the ultrapure water. This enables restraint of generation and proliferation of bacteria, or the like and a reduction in the content of microorganisms with the simple unit structure in the ultrapure water production process.

In addition, this also can omit an activated carbon device used in recovering the used ultrapure water and provided in the recovery treatment unit conventionally. This reduces space for providing the activated carbon device to save costs in that.

BRIEF DESCRIPTION OF THE DRAWINGS

FIG. 1 is a diagram illustrating a schematic structure of an ultrapure water production system of one embodiment.

DETAILED DESCRIPTION

Hereinafter, embodiments of an ultrapure water production system and an ultrapure water production method will be described referring to the drawings.
(Ultrapure Water Production System)

The ultrapure water production system of this embodiment is shown in an ultrapure water production system 1 including a pre-treatment unit 2, a primary pure water production unit 3, a secondary pure water production unit 4, a storage unit 5, a recovery treatment unit 6, and a circulator 7, as illustrated in FIG. 1. Hereinafter, each structure will be described in detail.

The pre-treatment unit 2 in this embodiment can have a structure similar to that of a pre-treatment unit used in the common ultrapure water production systems, and the structure of the pre-treatment unit 2 is not particularly limited.

The pre-treatment unit 2 can remove suspended matter from raw water to produce pre-treated water, and supply the pre-treated water to the primary pure water production unit 3. An example of the pre-treatment unit 2 includes at least one device for removing the suspended matter from the raw water, the at least one device being appropriately selected from a sand filtration device, a microfiltration device, and the like. The example of the pre-treatment unit 2 may further include a heat exchanger to regulate a temperature of the raw water, or the like, as necessary. The pre-treatment unit 2 may be eliminated in accordance with water quality of the raw water.

The primary pure water production unit 3 in this embodiment can have a structure similar to that of a primary pure water production unit used in the conventionally well-known ultrapure water production system, and the structure of the primary pure water production unit 3 is not particularly limited.

The primary pure water production unit 3 can remove impurities from the pre-treated water to produce pure water. An examples of the primary pure water production unit 3 includes at least one device appropriately selected from a reverse osmosis membrane device, a deaeration device such as decarboxylation, a vacuum deaeration device or a deaeration membrane device, an ion exchange device such as a cation exchange resin device, an anion exchange resin device, a mixed-bed ion exchange resin device or an electrodeionization device, and an ultraviolet oxidation device. The primary pure water production unit 12 can remove ionic components, nonionic components, and a dissolved gas from the pre-treated water to produce primary pure water, and supplies the produced primary pure water to the secondary pure water production unit 4.

An example of the primary pure water production unit 3 includes at least one device appropriately selected from a strongly basic anion exchange resin device, 2B3T-type devices such as a strongly acidic cation exchange resin device, a decarbonator or a basic anion exchange device, the reverse osmosis membrane device, the ultraviolet oxidation device, the mixed-bed ion exchange resin device, the deaeration membrane device. The example of the primary pure water production unit 3 may further include a heat exchanger to regulate a temperature of treatable water as necessary.

The secondary pure water production unit 4 in this embodiment can have a structure similar to that of a secondary pure water production unit used in the common ultrapure water production systems, and the structure of the secondary pure water production unit 4 is not particularly limited.

The secondary pure water production unit 4 can remove trace impurities from the primary pure water to produce ultrapure water. An example of the secondary pure water production unit 4 includes at least one device appropriately selected from an ultrafiltration membrane device, the heat exchanger, the ultraviolet oxidation device, a hydrogen peroxide removal device, the deaeration membrane device, a non-regenerative mixed-bed ion exchange resin device (Polisher). The example of the secondary pure water production unit 4 may further include the heat exchanger to regulate a temperature of the treatable water as necessary.

The storage unit 5 in this embodiment includes a tank or a pit. The tank or the pit is provided between the pre-treatment unit 2 and the primary pure water production unit 3. The tank or the pit can store the pre-treated water treated by the pre-treatment unit 2 and recovered water obtained by the later-described recovery treatment unit 6, which are each supplied thereto and are mixed therein, as the treatable water subsequent to the primary pure water production unit.

FIG. 1 shows that an example of the storage unit 5 is provided between the pre-treatment unit 2 and the primary pure water production unit 3 is represented, and the storage unit 5 may be provided in the previous stage to the pre-treatment unit 2, and supplied with the raw water once to mix it with the recovered water obtained by the recovery treatment unit 6.

The recovery treatment unit 6 in this embodiment can recover used ultrapure water containing hydrogen peroxide as the treatable water for producing the ultrapure water again by passing the hydrogen peroxide therethrough while removing impurities mixed for use therefrom.

Examples of the used ultrapure water used include ultra-pure water used for cleaning of a semiconductor wafer or the like in a place such as a semiconductor manufacturing plant to be mixed with chemicals used at that time. The cleaning of the semiconductor wafer uses chemical solutions such as SC-2, SPM, and FPM by adding them into the ultrapure water. Accordingly, the used ultrapure water contains acids such as a sulfuric acid, a phosphoric acid, and a hydrofluoric acid, hydrogen peroxide in addition to them, and the like.

In this case, the recovery treatment unit 6 preferably has a configuration capable of removing the acids such as the sulfuric acid, the phosphoric acid, and the hydrofluoric acid and passing the hydrogen peroxide therethrough, the acids and the hydrogen peroxide being contained in the used ultrapure water. The recovery treatment unit 6 can be exemplified by a structure in which a membrane treatment device 61 and a reverse osmosis membrane device 62 (first reverse osmosis membrane device) are disposed in this order, as illustrated in FIG. 1.

Examples of the membrane treatment device 61 include a device having a microfiltration membrane (MF) and a device having an ultrafiltration membrane (UF). The membrane treatment device 61 can remove fine particles contained in the used ultrapure water and is disposed to precede to the reverse osmosis membrane device 62. Note that the membrane treatment device is not an essential component.

Examples of the reverse osmosis membrane device 62 include a well-known reverse osmosis membrane device used for water treatment, and it is not particularly limited. The reverse osmosis membrane device 62 is suitable for the recovery treatment unit of this embodiment because it can pass hydrogen peroxide therethrough without removal thereof while removing ionic components derived from the acids.

In contrast, the common system uses the ion exchange resin device to decomposes and removes hydrogen peroxide to a certain extent, and thus the ion exchange resin device is preferably not provided in the recovery treatment unit of this embodiment.

The recovery treatment unit 6 is preferred not to have a device capable of removing the hydrogen peroxide, such as activated carbon or a catalyst resin supporting palladium or platinum. However, one capable of removing a part of the hydrogen peroxide may also be provided as long as it can pass the remainder thereof therethrough.

Accordingly, an activated carbon device is preferred not to be used in the recovery treatment unit 6, and if the activated carbon device is used, passing the used ultrapure water through this activated carbon device at a space velocity of $SV=40 \ hr^{-1}$ or more also allows the recovered water to contain the hydrogen peroxide therein.

Such recovery operation conventionally requires the removal of hydrogen peroxide, and normally, the activated carbon device is provided in a recovery treatment unit, but as described as a preferable aspect of this embodiment, providing no activated carbon device allows a reduction in a device installation area corresponding thereto, which is preferable in that the entire unit can be simplified.

The recovered water obtained by the recovery treatment unit 6 is circulated to the storage unit 5 by the circulator 7. The circulator 7 is constituted of a pipe capable of the recovered water flowing to the storage unit 5 therethrough.

The circulator 7 may have a flow rate adjuster which adjusts a flow rate of the recovered water to be supplied to the storage unit 5. Examples of the flow rate adjuster include a valve 1 can be represented as illustrated in FIG. 1. This can adjust an amount of the treatable water to be supplied from the pre-treatment unit 2 and an amount of the recovered water to be supplied from the circulator 7, and thus also allows the adjustment of a hydrogen peroxide concentration in the mixed water. The valve 1 only needs to be able to adjust the flow rate, and can use a well-known valve or the like.

(Ultrapure Water Production Method)

Next, regarding an ultrapure water production method of one embodiment, a case of using the ultrapure water production system illustrated in FIG. 1 will be described as an example.

First, raw water is supplied to the pre-treatment unit 2, and suspended matter in the raw water is removed to obtain pre-treated water. At this time, as the raw water, tap water, well water, ground water, industrial water, or the like is used. This pre-treated water is supplied to the storage unit 5.

Next, the pre-treated water is fed out from the storage unit 5 to the primary pure water production unit, and total organic carbon (TOC) components and ionic components in the pre-treated water are removed by using the reverse osmosis membrane device and the ion exchange device to produce primary pure water. Moreover, the obtained primary pure water is fed out to the secondary pure water production unit, and trace amounts of impurities in the primary pure water are removed to produce ultrapure water (secondary pure water).

At this time, a water quality of the obtained primary pure water has a resistivity of 17 MΩ·cm or more, for example, and a water quality of the obtained ultrapure water (secondary pure water) has a resistivity of 18 MΩ·cm or more, for example.

The obtained ultrapure water is supplied to a point of use (POU), and used depending on various purposes. At this time, as described above, for example, for the use for the cleaning of the semiconductor wafer, the used ultrapure water contains the hydrogen peroxide to be targeted for recovery in this embodiment. Such used ultrapure water is fed out to the recovery treatment unit of the ultrapure water production system of this embodiment to be changed to the recovered water by removing the acid components and the other impurities. This recovered water contains the hydrogen peroxide.

This recovered water is circulated to be fed out to the storage unit 5 by the circulator 7. The recovered water supplied to the storage unit 5 in a circulating manner is mixed with the pre-treated water to be reused as treatable water for ultrapure water production. As described above, the recovered water in this embodiment contains the hydrogen peroxide, which allows a disinfecting action thereof to effectively restrain the generation and proliferation of bacteria in the storage unit to which it is circulated.

Further, in this embodiment, in the storage unit 5, the pre-treated water and the recovered water are mixed, and the pre-treated water normally contains hypochlorite (for example, sodium hypochlorite (NaClO) or the like) for disinfection, and further the recovered water contains the hydrogen peroxide ($H_2O_2$), both of which contain components having the disinfecting action, which puts the interior of the storage unit 5 in a state of allowing the restraint of the generation and proliferation of bacteria.

Incidentally, the hypochlorite contained in the pre-treated water corresponds to the remainder after it is already used for disinfection treatment in the pre-treatment, and the hydrogen peroxide is weaker in disinfecting action than the hypochlorite. Further, mixing of the pre-treated water and the recovered water decreases their respective concentrations depending on the mixed amounts.

However, as in this embodiment, the present inventors have found that for the mixing of the pre-treated water and the recovered water, beyond the action obtained by simply adding their components together, a preferable disinfecting action can be obtained. The reason for this improvement in disinfecting action is considered as follows.

As described above, in the storage unit 5, the mixing of the pre-treated water and the recovered water causes the coexistence of the hypochlorite and the hydrogen peroxide in the mixed water, and their compounds react with each other to generate singlet oxygen ($^1O_2$) or OH radicals ($\cdot$OH). Both the singlet oxygen ($^1O_2$) and the OH radical ($\cdot$OH) have high activity to have the action of decomposition of organic substances, or the like, which allows significant improvement in the disinfection treatment in the storage unit 5 as compared with independent use of the hypochlorite and independent use of the hydrogen peroxide to exhibit the preferable disinfecting action.

Moreover, the generated singlet oxygen ($^1O_2$) or OH radicals ($\cdot$OH) partly react with the organic substances (TOC components) in the water. As a result, the form of easy removal with the reverse osmosis membrane device and the ion exchange device can also be promising for a reduction in TOC in treated water in the reverse osmosis membrane device and the ion exchange device.

At this time, the concentration of the hydrogen peroxide in the recovered water is preferably 2 to 50 ppm, and more preferably 4 to 20 ppm. The concentrations within this range allow the reaction with the hypochlorite in the pre-treated water to effectively generate the singlet oxygen or the OH radicals. At this time, the concentration of the hypochlorite in the pre-treated water is preferably 0.05 to 10 ppm, and more preferably 0.1 to 2 ppm. Even addition amounts in these amounts cause the reaction of the hypochlorite and the hydrogen peroxide to eliminate most of the hypochlorite. Note that the addition amount of the hypochlorite is recommended to be appropriately adjusted to the extent to which a hypochlorous acid does not remain through the decomposition caused by the hydrogen peroxide.

Further, in the storage unit 5, a supply amount of the pre-treated water and a supply amount of the recovered water are each preferably set to an amount in which the concentration of the hydrogen peroxide in the mixed water in which they are mixed falls within 1 to 10 ppm (this hydrogen peroxide concentration can be calculated by a mixing ratio of the pre-treated water and the recovered water). To obtain such a concentration, for example, a ratio of the supply amount of the recovered water to the supply amount of the pre-treated water (the supply amount of the recovered water/the supply amount of the pre-treated water) is preferably set to 10/90 to 50/50, and more preferably set to 20/80 to 40/60.

The use of the production system and the production method of the ultrapure water as described above preferably also allows reuse as the treatable water for the production of the ultrapure water while using the hydrogen peroxide contained in the used ultrapure water for the disinfection treatment. Further, to obtain such an action as described above, in contrast to the conventional production system of ultrapure water, which reuses used ultrapure water, the unit structure of the recovery treatment unit is allowed to have such simplification as to enable an elimination of the activated carbon device therefrom, for example.

MODIFIED EXAMPLE

The above refers to the case where the reaction with the hydrogen peroxide eliminates most of the hypochlorite, and depending on conditions, a malfunction, or the like, the hypochlorite is sometimes considered to remain to be contained in the primary pure water production unit.

Thus, in the first embodiment described above, moreover, the activated carbon device is preferably provided in the primary pure water production unit to remove the hypochlorite. At this time, the primary pure water production unit is normally provided with the reverse osmosis membrane device (hereinafter, referred to as a second reverse osmosis membrane device), and the activated carbon device is provided in the previous stage to the second reverse osmosis membrane device. Such a disposition allows restraint of degradation of the second reverse osmosis membrane device due to the hypochlorite in the treatable water supplied from the storage unit 5 to the primary pure water production unit.

As this activated carbon device, well-known activated carbon used for water treatment can be used, and it can be exemplified by, for example, palm shell activated carbon, coal-based activated carbon, and the like. These activated carbons are each formed with very many pores of about 10 to 10000 Å in size (most of them have pores of 10 to 20 Å in size) in the interior thereof, and each have a specific surface area of about 500 to 1500 $m^2$. To obtain high decomposition ability, a decomposition catalyst such as platinum, palladium, or silver may be supported. Values of pore distribution and a specific surface area of the activated carbon in this embodiment are measured by an absorption method or a mercury intrusion method by using a nitrogen gas ($N_2$), an argon gas (Ar), or the like.

In the primary pure water production unit, as long as the hypochlorite can be removed, the hydrogen peroxide may be passed or removed through/in the activated carbon device. Most of the hypochlorite reacts with the hydrogen peroxide to be eliminated in the storage unit 5 and the subsequent stage thereto, and removal of the slightly remaining hypochlorite facilitates the removal in the activated carbon device. Thus, a space velocity in the activated carbon device can be used in a range of SV=5 to 40 $hr^{-1}$. For normally used SV=5 to 10 $hr^{-1}$, the hydrogen peroxide is well removed together with the hypochlorite, and for high-flow-velocity SV=10 to 40 $hr^{-1}$, the hypochlorite is removed, and at the same time, the hydrogen peroxide is easily passed through. Accordingly, variations in treatment conditions in the activated carbon device also allow the adjustment of the hydrogen peroxide concentration in the treatable water flowing through the subsequent stage. Setting the hydrogen peroxide concentration in the treatable water flowing through the subsequent stage to 0.1 to 1 ppm allows the restraint of the generation and proliferation of bacteria, or the like between the activated carbon device, the reverse osmosis membrane device in the subsequent stage, and the like, which enables stable operation of the reverse osmosis membrane device in the subsequent stage, or the like.

In the activated carbon device, for the treatment at high-flow-velocity SV=10 to 40 hr$^{-1}$, the activated carbon device to be used is preferred to increase the proportion of 20 to 1000 Å pores to 10 vol % or more, and preferably to 20 vol % or more, or to be activated carbon having high decomposition ability, on which the decomposition catalyst such as platinum, palladium, or silver is supported.

The activated carbon in which the ability to decompose the hydrogen peroxide is enhanced by varying the pore distribution can be exemplified by, for example, CENTAUR (trade name) sold from Calgon Carbon Japan Co., Ltd. Further, the activated carbon supporting a highly active hydrogen peroxide decomposition catalyst can be exemplified by T-SB (trade name) manufactured by Kuraray Chemical Co., Ltd.

To adjust the hydrogen peroxide concentration, a hydrogen peroxide removal device ($H_2O_2$ removal device) except for the activated carbon may be provided. This hydrogen peroxide removal device is a device which decomposes and removes the hydrogen peroxide in the water, and for example, a metal catalyst supported resin device which decomposes and removes the hydrogen peroxide by using a resin supporting palladium (Pd) or platinum (Pt), a reducing resin device filled with a reducing resin having a sulfite group and/or a bisulfite group on its surface, and the like are cited.

Further, for little presence of the hypochlorite in the water flowing into the activated carbon device, the activated carbon device is provided with a bypass line, and using this bypass line also allows the adjustment of the hydrogen peroxide concentration.

The residual hydrogen peroxide only needs to be removed by further using a hydrogen peroxide removal means in the subsequent stage to the reverse osmosis membrane device or the like. As this hydrogen peroxide removal means, for example, the metal catalyst supported resin device which decomposes and removes the hydrogen peroxide by using the resin supporting palladium (Pd) or platinum (Pt), the reducing resin device filled with the reducing resin having the sulfite group and/or the bisulfite group on its surface, the activated carbon device described in the recovery treatment unit and primary pure water production unit, and the like are cited.

EXAMPLES

Hereinafter, the embodiments will be described referring to an example and comparative examples. The embodiments are not limited and construed by the example.

Example 1

The ultrapure water production system illustrated in FIG. 1 was used to produce ultrapure water, which was used for cleaning (SPM cleaning) of a semiconductor wafer in a semiconductor manufacturing apparatus. Used ultrapure water after the cleaning contained a sulfuric acid, a phosphoric acid, hydrogen peroxide, and the like, and they were treated by the recovery treatment unit to obtain recovered water. The devices used in the recovery treatment unit are as follows.

<Recovery Treatment Unit>

The membrane treatment device 61: a bag filter manufactured by 3M Company 1 μm

The reverse osmosis membrane device 62: a low-pressure RO (manufactured by Toray Industries, Inc., trade name: TM720D) an operating pressure of 0.6 MPa A hydrogen peroxide concentration in the recovered water obtained through treatment in order of the membrane treatment device 61 and the reverse osmosis membrane device 62 (first reverse osmosis membrane device) was 20 ppm, and the recovered water was circulated to be supplied to the storage unit 5. In the storage unit 5, pre-treated water obtained by the pre-treatment unit and the recovered water were mixed, and they were used as treatable water to continuously produce ultrapure water. A mixing ratio was pre-treated water:recovered water=4:1.

Note that Table 1 presented a sodium hypochlorite concentration in the pre-treated water and the hydrogen peroxide concentration in the recovered water at this time. Further, viable bacteria counts in mixed water in the storage unit 5 and at an inlet of the reverse osmosis membrane device (second reverse osmosis membrane device) provided in the primary pure water production unit, and TOC concentrations of raw water and at an outlet of the second reverse osmosis membrane device were each measured to be presented in Table 1.

Measurement of the sodium hypochlorite concentration: with respect to the pre-treated water, a residual chlorine meter (a DPD (diethyl-p-phenylenediamine method) method, manufactured by SIBATA SCIENTIFIC TECHNOLOGY LTD., a simple water test kit) was used to carry out a measurement.

The hydrogen peroxide concentration: with respect to the recovered water, an on-line hydrogen peroxide measuring device (NOXIA) (manufactured by Nomura Micro Science Co., Ltd.) was used to carry out a measurement.

Measurement of the viable bacteria counts: samples collected from the raw water and at the inlet of the second reverse osmosis membrane device were used to carry out a measurement by using a culture method (a standard agar medium, culture at 32 degrees for seven days).

Measurement of the TOC: from the raw water and at the outlet of the second reverse osmosis membrane device, Sievers M9e (manufactured by Suez Inc.) was used to carry out a measurement.

Comparative Example 1

In contrast to Example 1, except that a recovery treatment unit had a unit structure in which an activated carbon device (manufactured by Mitsubishi Chemical Corporation, trade name: Diahope 006, and manufactured by Calgon Carbon Japan Co., Ltd., trade name: a double bed of CENTAUR, a 2:1 volume ratio) and a weakly basic anion exchange device (manufactured by Dow•Du Pont, trade name: A368D) were connected in order, similarly to Example 1, ultrapure water was produced while mixing recovered water.

Similarly to Example 1, water quality was measured to be presented together in Table 1.

Comparative Example 2

Except that a sulfurous acid was added to pre-treated water to remove sodium hypochlorite, similarly to Example 1, ultrapure water was produced while mixing recovered water.

Similarly to Example 1, water quality was measured to be presented together in Table 1.

TABLE 1

| | | NaClO (ppm) | H$_2$O$_2$ (ppm) | Viable bacterium (CFU/mL) | | TOC (ppb) | |
|---|---|---|---|---|---|---|---|
| | | Pre-treated water | Recovered water | In storage unit | RO inlet | In storage unit | RO outlet |
| Example 1 | NaClO + H$_2$O$_2$ | 0.2 | 20 | 700 | 1,100 | 1,300 | 19 |
| Comparative example 1 | Only NaClO | 0.2 | 0 | 1,700 | 4,300 | 1,300 | 30 |
| Comparative example 2 | Only H$_2$O$_2$ | 0 | 20 | 2,200 | 5,500 | 1,300 | 32 |

From the above, in the ultrapure water production system which recovers and reuses the used ultrapure water containing the hydrogen peroxide, the circulation while intentionally containing the hydrogen peroxide in the recovery treatment and the use as the treatable water were found to allow restraint of the viable bacteria counts, the TOC, and the like after mixing with the raw water or the pre-treated water.

At this time, the activated carbon device normally provided in the recovery treatment can be eliminated, which also enables a reduction in installation area along with simplification of the unit.

What is claimed is:

1. An ultrapure water production system configured to produce an ultrapure water, the ultrapure water production system comprising:

a pre-treatment unit:

a primary pure water production unit:

a secondary pure water production unit;

a storage unit provided to precede the pre-treatment unit or provided between the pre-treatment unit and the primary pure water production unit, the storage unit being configured to store a treatable water including a raw water or a pre-treated water, the pre-treated water being obtained by treating the raw water through the pre-treatment unit, a recovery treatment unit configured to remove impurities including cleaning solution mixed in a used ultrapure water obtained after use of the ultrapure water and containing hydrogen peroxide while passing a part or the whole of the hydrogen peroxide therethrough, to make a recovered water, and a circulator configured to circulate the recovered water from the recovery treatment unit to feed the recovered water back to the storage unit.

2. The ultrapure water production system according to claim 1, wherein the recovery treatment unit comprises a reverse osmosis membrane device.

3. The ultrapure water production system according to claim 1, wherein the recovery treatment unit does not include any activated carbon device.

4. The ultrapure water production system according to claim 1, wherein the primary pure water production unit comprises a reverse osmosis membrane device, and a hypochlorous acid removal device provided to precede the reverse osmosis membrane device.

5. The ultrapure water production system according to claim 4, wherein the hypochlorous acid removal device is an activated carbon device.

6. The ultrapure water production system according to claim 5, wherein the activated carbon device has 10 vol % or more of pores with a pore size of 20 to 1000 angstroms, or has a decomposition catalyst of platinum, palladium, or silver.

7. The ultrapure water production system according to claim 1, comprising a flow rate adjuster capable of adjusting a supply amount of the recovered water to be supplied to the storage unit relative to a supply amount of the raw water or the pre-treated water to be supplied to the storage unit to 10/90 to 50/50.

8. The ultrapure water production system according to claim 1, wherein the recovery treatment unit is configured to make the recovered water so that a concentration of the hydrogen peroxide in the recovered water is 2 to 50 ppm.

9. The ultrapure water production system according to claim 1, wherein the circulator is configured to circulate the recovered water from the recovery treatment unit to feed the recovered water back to the storage unit so that in the storage unit, a concentration of the hydrogen peroxide in a mixed water comprising the pre-treated water and the recovered water is 1 to 10 ppm.

10. An ultrapure water production method of treating a raw water in a pre-treatment unit, a primary pure water production unit, and a secondary pure water production unit to produce an ultrapure water, a treatable water including the raw water or a pre-treated water being storable in a storage unit provided to precede the pre-treatment unit or provided between the pre-treatment unit and the primary pure water production unit, the pre-treated water being obtained by treating the raw water through the pre-treatment unit, the ultrapure water production method comprising:

removing impurities including cleaning solution acids mixed in a used ultrapure water obtained after use of the ultrapure water and containing hydrogen peroxide through a recovery treatment unit while passing a part or the whole of the hydrogen peroxide therethrough, to make a recovered water; and circulating the recovered water to feed the recovered water back to the storage unit.

11. The ultrapure water production method according to claim 10, wherein the recovery treatment unit has a reverse osmosis membrane device.

12. The ultrapure water production method according to claim 10, wherein a concentration of the hydrogen peroxide in the recovered water is 2 to 50 ppm.

13. The ultrapure water production method according to claim 10, wherein in the storage unit, a concentration of the hydrogen peroxide in a mixed water comprising the pre-treated water and the recovered water is 1 to 10 ppm.

14. The ultrapure water production method according to claim 10, wherein the primary pure water production unit has a reverse osmosis membrane device, and a hypochlorous acid removal device in a previous stage thereto, and the hypochlorous acid removal device removes hypochlorite contained in the recovered water.

15. The ultrapure water production method according to claim 14, wherein the hypochlorous acid removal device is an activated carbon device.

16. The ultrapure water production method according to claim 15, wherein the activated carbon device is configured to cause the treatable water to pass through at a space velocity (SV) of 5 to 40 $hr^{-1}$.

17. The ultrapure water production method according to claim 10, wherein the circulating comprises feeding the recovered water from the recovery treatment unit to the storage unit.

\* \* \* \* \*